US012492592B1

(12) United States Patent
Schuft

(10) Patent No.: US 12,492,592 B1
(45) Date of Patent: Dec. 9, 2025

(54) PIVOTING GARAGE DOOR

(71) Applicant: PREMIER DOOR Co., Stewart, MN (US)

(72) Inventor: Nicolas Dale Schuft, Stewart, MN (US)

(73) Assignee: Premier Door Co., Stewart, MN (US)

( * ) Notice: Subject to any disclaimer, the term of this patent is extended or adjusted under 35 U.S.C. 154(b) by 683 days.

(21) Appl. No.: 17/827,486

(22) Filed: May 27, 2022

Related U.S. Application Data

(60) Provisional application No. 63/194,033, filed on May 27, 2021.

(51) Int. Cl.
*E06B 3/50* (2006.01)
*E05D 15/22* (2006.01)

(52) U.S. Cl.
CPC ............ *E06B 3/5018* (2013.01); *E05D 15/22* (2013.01); *E05D 2015/225* (2013.01); *E05Y 2900/106* (2013.01)

(58) Field of Classification Search
CPC ..... E06B 3/5009; E06B 3/5018; E05D 15/22; E05D 2015/225; E05F 15/57; E05F 15/59
See application file for complete search history.

(56) References Cited

U.S. PATENT DOCUMENTS 663,989 A * 12/1900 Wilson .................... E05D 15/38 49/197
1,843,973 A * 2/1932 Dickason .............. E05D 15/445 49/204
2,054,735 A * 9/1936 Asquith ................ E05D 15/445 49/197
2,080,904 A * 5/1937 Wanner ..................... E05F 1/02 49/197
2,472,602 A * 6/1949 Manville ............... E05D 15/583 49/206
3,346,238 A * 10/1967 Dashio .................. E04H 17/165 49/202
3,468,060 A * 9/1969 Mursinna ................ E05F 15/59 49/203
3,849,937 A * 11/1974 Blumenthal .......... E05D 15/445 49/206

(Continued)

FOREIGN PATENT DOCUMENTS

BE 1019503 A3 * 8/2012 ............... E06B 3/68
EP 3032016 A1 * 6/2016

*Primary Examiner* — Catherine A Kelly
(74) *Attorney, Agent, or Firm* — Shewchuk IP Services, LLC; Jeffrey D. Shewchuk

(57) ABSTRACT

A door assembly provides a one-piece, swing up door panel known as a "California-type" garage door, with a mid-height pivot axis travelling vertically during operation of the door. The rotational motion of the door is caused by a follower riding in a slot of a plate, with the follower being offset relative to the pivot axis and fixed relative to the door panel. The slot places forces on the follower during motion of the door panel between the door-closed position and the door-opened position, with the offset causing the forces to act as moments rotationally accelerating and rotationally decelerating the door between the door-closed position and the door-opened position. The slot preferably has a start non-rotational portion and an end non-rotational portion during which the door panel translates vertically without pivoting of the door panel, as well as different intermediate portions which have different rotational speeds.

20 Claims, 7 Drawing Sheets

(56) References Cited

U.S. PATENT DOCUMENTS

| | | | | |
|---|---|---|---|---|
| 4,254,582 | A | 3/1981 | McGee | |
| 4,338,553 | A | 7/1982 | Scott, Jr. | |
| 4,765,093 | A * | 8/1988 | Edwards, Jr. | E05D 15/38<br>49/197 |
| 5,373,663 | A | 12/1994 | Turini | |
| 5,711,113 | A * | 1/1998 | Nygørd | E05D 15/401<br>49/206 |
| 6,118,243 | A | 9/2000 | Reed et al. | |
| 6,883,273 | B2 | 4/2005 | Kerkvliet | |
| 7,814,957 | B2 | 10/2010 | Crown | |
| 8,245,446 | B2 | 8/2012 | Betker | |
| 8,327,586 | B2 | 12/2012 | Keller et al. | |
| 8,539,716 | B2 | 9/2013 | Betker | |
| 8,714,229 | B2 | 5/2014 | Crown et al. | |
| 8,769,871 | B2 | 7/2014 | Betker | |
| 8,800,208 | B2 | 8/2014 | Keller et al. | |
| 9,015,996 | B2 | 4/2015 | Betker | |
| 9,091,107 | B2 | 7/2015 | Betker | |
| 9,273,507 | B2 * | 3/2016 | Petrat | E05F 15/53 |
| 9,404,301 | B2 | 8/2016 | Betker | |
| 9,428,951 | B2 | 8/2016 | Betker | |
| 9,523,233 | B2 | 12/2016 | Keller et al. | |
| 9,567,789 | B2 * | 2/2017 | Crown | E05D 15/38 |
| 9,631,418 | B2 * | 4/2017 | Crown | E06B 1/522 |
| 10,208,529 | B2 | 2/2019 | Betker | |
| 10,604,991 | B2 | 3/2020 | Schweiss | |
| 11,898,389 | B2 * | 2/2024 | Macdonald | E05F 15/668 |
| 2021/0025220 | A1 * | 1/2021 | Capoferri | E05D 7/084 |

* cited by examiner

PIVOTING GARAGE DOOR

CROSS-REFERENCE TO RELATED APPLICATION(S)

The present application claims the benefit of U.S. provisional patent application Ser. No. 63/194,033, filed May 27, 2021, entitled "Pivoting Garage Door". The contents of U.S. provisional patent application Ser. No. 63/194,033 are hereby incorporated by reference in entirety.

BACKGROUND OF THE INVENTION

The present application relates to what are commonly referred to as garage doors (regardless of whether installed on a garage or on a different building), and to methods and structures for moving garage doors between open and closed positions. For instance, the garage door motion for opening and closing may be powered by one or more power cylinders, and in most instances the power for such power cylinders will be hydraulic. Alternatively, power may be provided by an electric motor turning an output shaft, transferred to the garage door such as with a chain or screw drive In its most preferred embodiments, the garage door of the present invention is primarily formed as a single panel, opening and closing primarily via pivoting about a horizontal pivot axis. Such doors are sometimes referred to as "California-type" doors. While it could be formed of wood or similar material, in most applications the door panel itself is primarily formed by a skeleton of vertical and horizontal metal supports which are welded together, with a sheet of thin material (typically sheet metal) connected on one side (typically the outer side) of the skeleton. Prior art examples of such California-type doors are shown in U.S. Pat. Nos. 2,080,904, 4,254,582, 4,338,553, 5,373,663, 6,118,243, 9,273,507 and 9,567,789, all incorporated by reference.

The operation of existing California-type garage doors is not as elegant and smooth as desired, leading to higher stresses on the component parts and/or power equipment and premature failure modes. Often, existing California-type garage doors have bars, linkages or power equipment which take up space within the garage or are exposed to weather outside the garage. The bars, linkages or power equipment can be create tripping or leg-bumping, arm-bumping or head-bumping dangers, or can be unsightly either within or outside the garage. The cost of existing California-type garage doors, though often lower than multi-panel garage doors, can be excessive. Better solutions are needed.

SUMMARY OF THE INVENTION

The present invention is an assembly including a one-piece, swing up door panel, typically used on a garage or similarly on an exterior wall of a building, sometimes referred to as a "California-type" garage door, as well as an improved rotation-inducing mechanism for such a door. The door panel is supported by a door support which defines a pivot axis for the door which moves at least vertically during operation of the door, with ends of the door support supporting substantially all of the weight of the door panel when in the upper door-opened position. A constraining member controls the path of the door support between the lower door-closed position and an upper door-opened position, with the preferred constraining member being the ram of a vertically oriented hydraulic cylinder. A track is defined in one of the uprights of the door opening. A follower is secured relative to the door panel at an offset relative to the pivot axis, the follower riding the track, wherein the track places forces on the follower during motion of the door panel between the door-closed position and the door-opened position, the offset causing the forces to act as moments rotationally accelerating and rotationally decelerating the door between the door-closed position and the door-opened position. In one aspect, the motion of the door panel includes a non-rotational motion portion during which the pivot axis translates vertically without pivoting of the door panel.

BRIEF DESCRIPTION OF THE DRAWINGS

The present invention is described with reference to the attached drawing sheets, in which.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
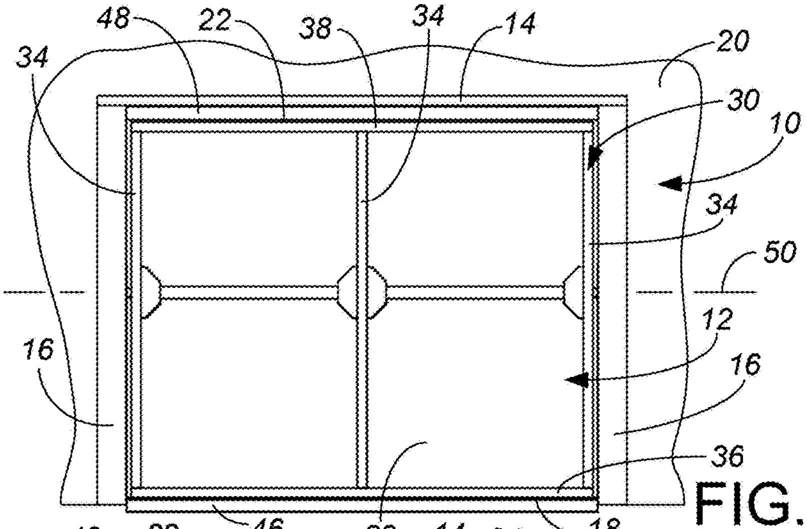
FIG. 1 is a rear elevation view, from inside the building, of a preferred door assembly in accordance with the present invention, shown in the door-closed position in which the door panel is substantially vertical.
Figure 2:
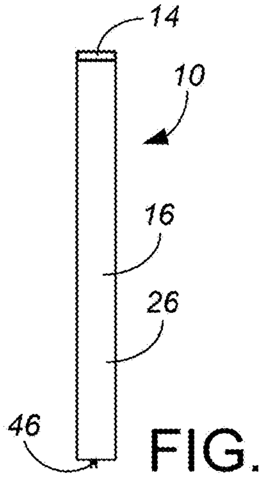
FIG. 2 is a side view of the door assembly of FIG. 1, not showing the building sidewall.

The present invention is a garage door assembly 10 which uses a door panel 12, mounted in a location which is (in the door-closed position of FIGS. 1 and 2) vertically beneath a header 14 and between two uprights 16. While the door panel 12 could be a top door panel of a bi-fold door with another panel (not shown) hinged to a bottom edge 18 of the door panel 12 shown, more preferably the door panel 12 is used for a single panel garage door. The single panel door of the present invention has fewer moving parts than many other types (bi- or multi-fold, lift-strap or sliding) of garage doors, often resulting in lower maintenance costs and repair problems over time. The garage door assembly 10 is used in a sidewall 20 of a building (the rest of which is not shown), most commonly substantially coplanar with the sidewall 20. While the sidewall 20 is most commonly vertical, some buildings have side walls which are intentionally or unintentionally slanted to some degree. The term "vertical", as used herein, is generally in accordance with the plane defined by the uprights 16 with the header 14 at the top, even if installed not entirely vertical relative to gravity. While it could be mounted oppositely, most mounting arrangements will have the bottom edge 18 of the door panel 12 kick outward from the garage during opening, and the terms "inside" and "outside" as used herein assume such a mounting arrangement.

The lengths of the uprights 16 and header 14 can be selected as desired for door opening size and for the strength requirements of the door assembly 10 and the materials selected. The most preferred door assembly 10 shown has a header length of about 110 inches and upright heights of about 83 inches supporting the header 14, i.e., the door opening shown is about 98 inches wide and 83 inches tall, and the door assembly 10 fits in a rough opening of about 110 inches wide by 85 inches tall. The preferred door opening and door panel 12 are rectangular, but trapezoidal or other polygon shapes could alternatively be used. Being rectangular, the door panel 12 has a top edge 22, a bottom edge 18 parallel to the top edge 22, and opposing side edges 24 at right angles to the top edge 22 and bottom edge 18.

The uprights 16 have an outer casing 26 which preferably is largely hollow so as to contain the power structure 28 for the door assembly 10 at least partially within each upright casing 26. This arrangement helps to safely protect users from coming into contact or otherwise injuring themselves on moving parts when the door panel 12 opens and/or closes, and also provides a very clean, aesthetically appealing look. For instance, each upright casing 26 can have a hollow, rectangular horizontal cross-section of about 6 inches wide and 8 inches deep.

The door panel 12 is preferably formed as a skeleton frame structure 30 supporting a sheet 32 of thin material. While the door panel 12 could be partially or fully made of wood or other organic building materials or of polymer materials, and while part or all of the sheet material 32 could alternatively be glass, more preferably both the skeleton frame structure 30 and the sheet material 32 are formed of metal, with aluminum or more preferably steel being common choices. In the most preferred embodiment, the door skeleton 30, uprights 16 and header 14 are formed from rectangular tubes of commercial grade steel to out-last and out-perform other hydraulic doors.

At this size, the preferred door skeleton 30 includes three vertical studs 34 (one along each side edge 24 of the door panel 12 and one spaced in the middle) extending between a foot plate 36 and a top plate 38, as well as cross braces 40 which define another crossbar 42 (i.e., the crossbar 42 includes multiple cross braces 40 so as to extend all the way across the door panel 12 like the foot plate 36 and the top plate 38) at an elevation between the foot plate 36 and the top plate 38. For wider door panels up to about fifty feet wide, more studs are used, or fewer studs can be used for narrower doors. To minimize cost, the studs 34, foot plate 36, top plate 38 and cross braces 40 have a cross-section which matches those commonly used in wall construction, such as (in the United States) being tubular of about 1½×3½ inch outer dimensions. Angled or additional braces could be used to add strength to the skeleton frame 30. The sheet metal 32 is attached on what will commonly be the outer or front side of the door 10 when hung on the building, so the sheet metal 32 is exposed to the elements such as precipitation and sunlight and protects the skeleton 30 and the interior of the building from the elements. The studs 34, foot plate 36, top plate 38 and cross braces 40 are welded or otherwise suitably connected together and to the sheet metal 32, such that the door panel 12 as a whole is substantially rigid. For instance, the preferred embodiment includes eight trapezoidal attachment brackets 44 for the cross braces 40 to facilitate the assembly and welding operations. While the preferred embodiment rigidly attaches the sheet metal 32 to the skeleton frame 30 at numerous locations, and the sheet metal 32 helps maintain the right angles of the skeleton frame 30. While most garage doors are rectangular with a horizontal foot plate 36 and a horizontal top plate 38, the present invention can also be used in other shapes or layouts of garage doors.

Compressible weather strips made of a flexible material such as rubber, neoprene, nitrile, silicone or vinyl, can be included either along the bottom edge 18 of the door panel 12, along the top edge 22 of the door panel 12, along the bottom of the header 14, or in two or all three of these locations. The most preferred embodiment utilizes one compressible weather strip 46 (shown uncompressed in the drawings) along the bottom edge 18 of the door panel 12 (in the most preferred embodiment, about 3 inches in uncompressed height). The most preferred embodiment utilizes a second weather strip 48 along the bottom of the header 14 (in the most preferred embodiment, about 3 inches in height), which can either be slightly in front of the top edge 22 of the door panel 12 or could be compressible if placed directly in line with the door panel 12 over the top plate 38.

Figure 7:
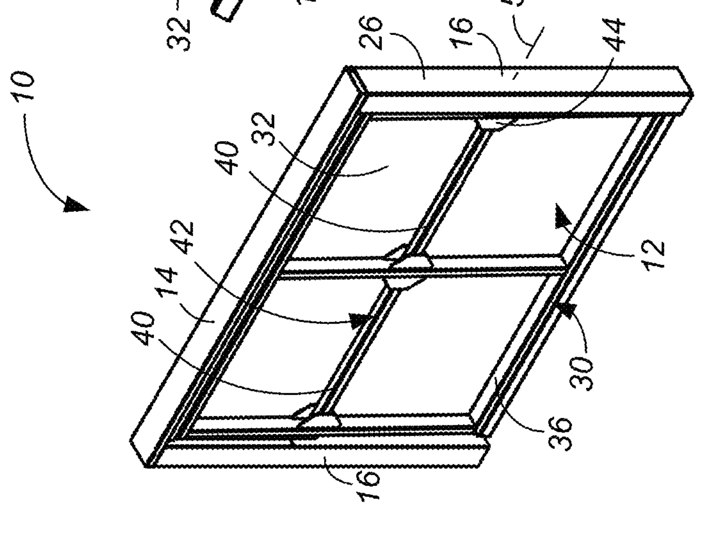
FIG. 7 is a perspective view, from above and behind the door panel, of the preferred door assembly in the position of FIGS. 1 and 2, not showing the building sidewall.

During operation of the door, the door panel 12 pivots about a pivot axis 50 which changes elevation, with the pivot axis 50 rising while the door panel 12 is being opened and lowering while the door panel 12 is being closed. The substantial entirety of the weight of the door is supported from structure at the pivot axis 50. The pivot axis 50 for the door is positioned at a mid-elevation on the door panel 12, preferably such that when opened both portions of the door (i.e., the portion inside the pivot axis 50 and the portion outside the pivot axis 50) cantilever and produce significant counteracting gravitational moments about the pivot axis 50. For instance, in the door-closed position of FIGS. 1, 2 and 7, the pivot axis 50 can be at an elevation within a range of 40% to 75% of the door panel height, or more preferably within a range of 51% to 60% of the door panel height.

Figure 3:
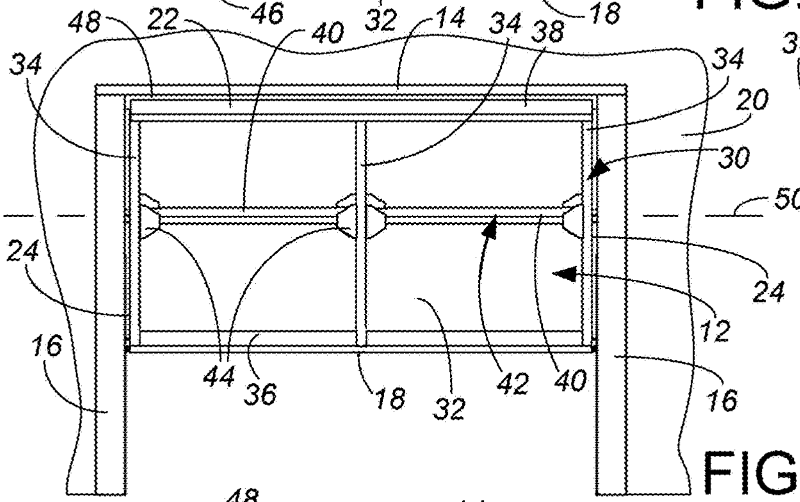
FIG. 3 is a rear elevation view, from inside the building, of the door assembly of FIGS. 1 and 2, shown with the door panel partially open.
Figure 4:
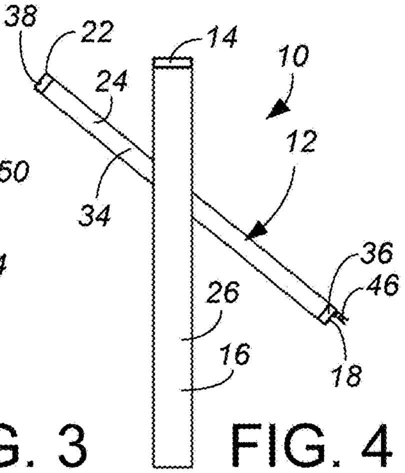
FIG. 4 is a side view of the door assembly of FIG. 3, not showing the building sidewall.
Figure 5:
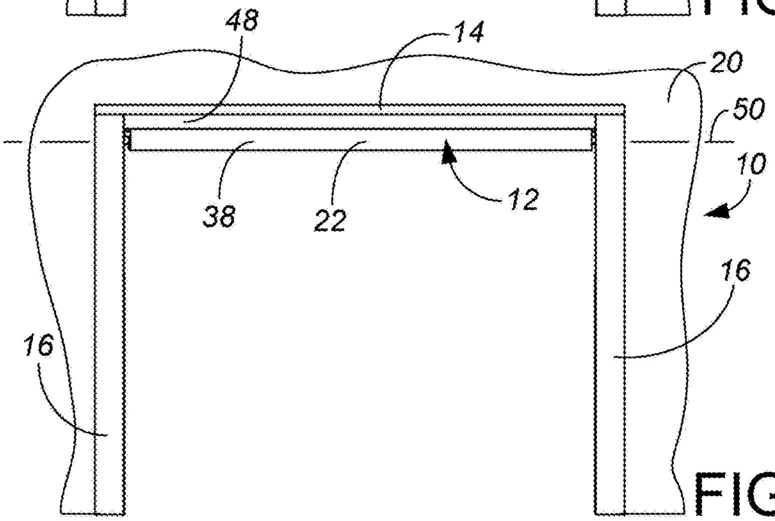
FIG. 5 is a rear elevation view, from inside the building, of the door assembly of FIGS. 1-4, shown with the door panel in the preferred door-opened position.
Figure 6:
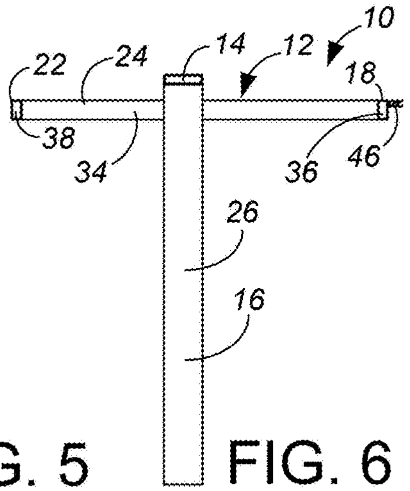
FIG. 6 is a side view of the door assembly of FIG. 5, not showing the building sidewall.
Figure 8:
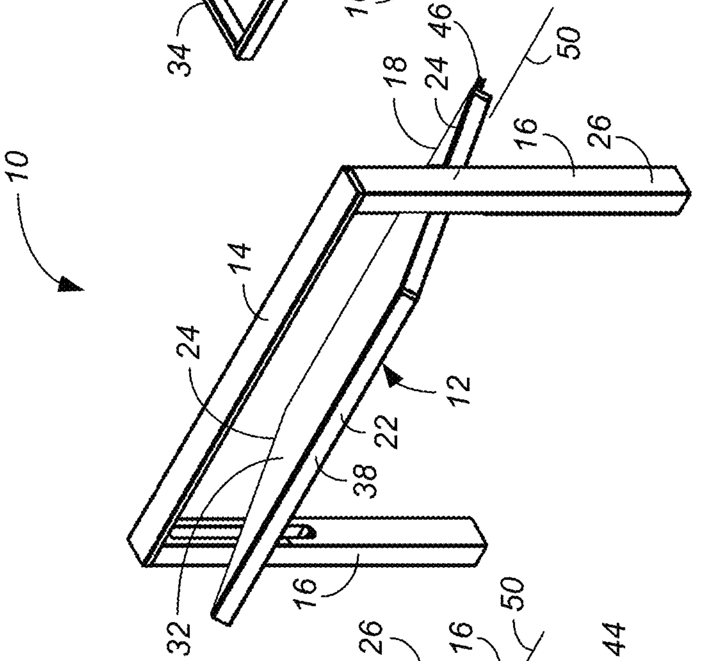
FIG. 8 is a perspective view, from above and behind the door panel, of the preferred door assembly in the position of FIGS. 3 and 4, not showing the building sidewall.
Figure 9:
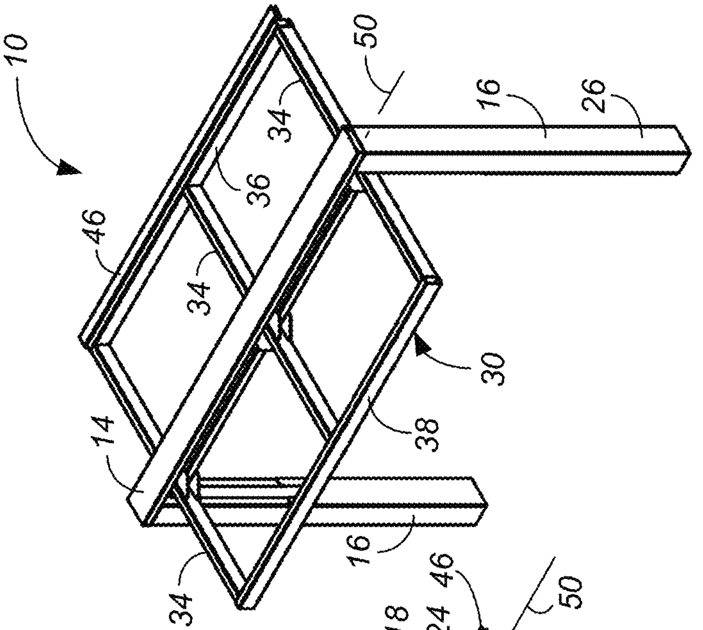
FIG. 9 is a perspective view, from above and behind the door panel, of the preferred door assembly in the position of FIGS. 5 and 6, not showing the building sidewall, and also not showing the outer sheet metal so the door panel skeleton can be better seen.
Figure 10:
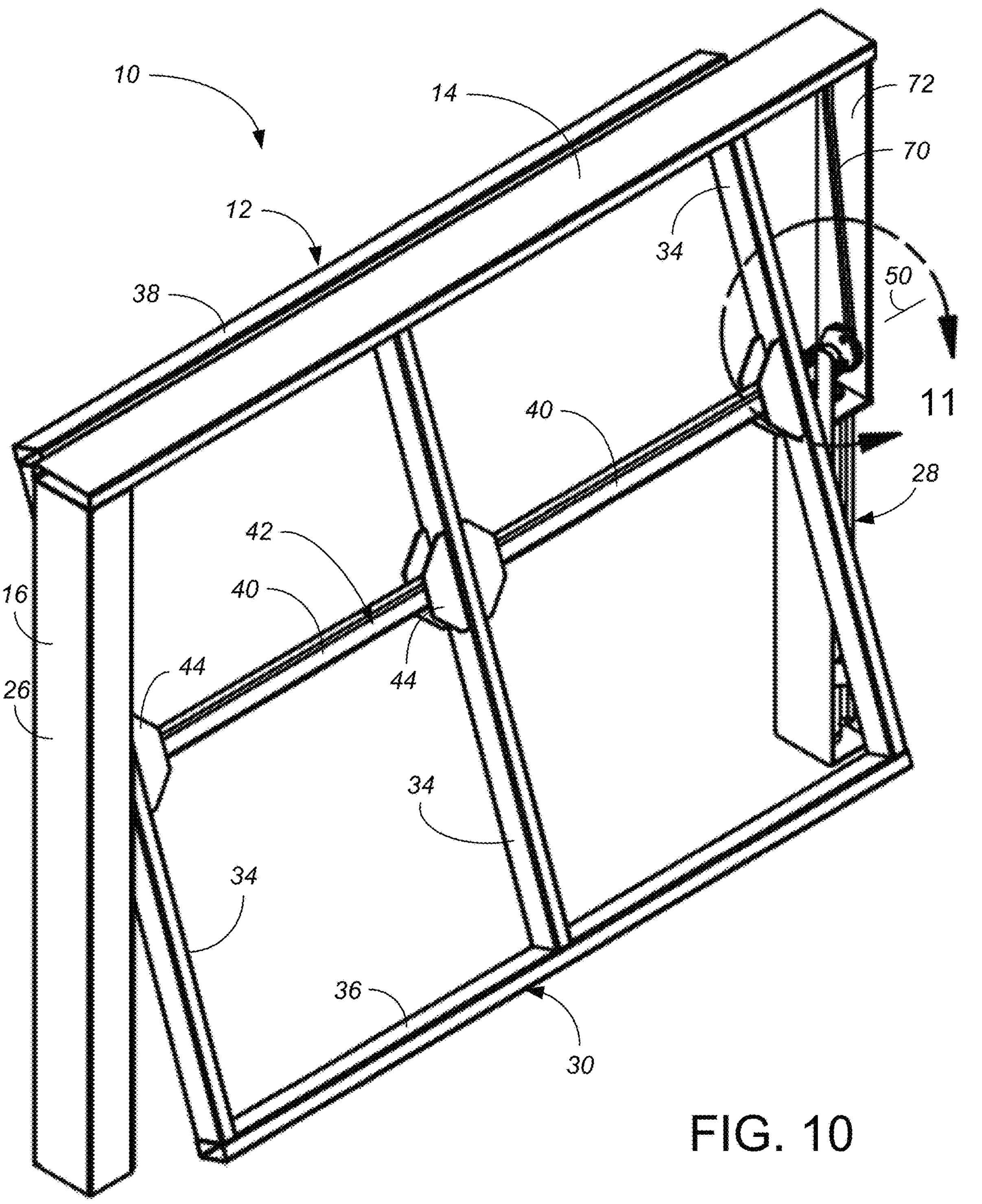
FIG. 10 is a perspective view, from above and in front of the door panel, of the preferred door assembly in a slightly-opened position, not showing the building sidewall or the outer sheet metal of the door panel, and also not showing part of the right (when facing the door from outside) upright casing so the right power structure can be better seen.

Locating the pivot axis 50 at a mid-elevation below 75% of the door panel height allows for pivoting of the door panel 12 with significant parts of the door weight both inside and outside the pivot axis 50 while pivoting (such as in the position of FIGS. 3, 4 and 8) and in the door-opened position of FIGS. 5, 6 and 9. If the pivot axis 50 is in the range of 40-60% of the door panel height, the two counteracting gravitational moments will be more equally balanced. Locating the pivot axis 50 at a mid-elevation above 50% of the door panel height allows more room for the power structure 28 within the uprights 16 and beneath the pivot axis 50 (including in the door-closed position), particularly beneficial when a hydraulic cylinder and ram is used for powering the door assembly 10. Locating the pivot axis 50 at a mid-elevation above 50% of the door panel height also allows more of the frame 30 and door panel 12 to be in tension while in the door-closed position, beneficial for smoother operation and longer life of the door assembly 10. In the most preferred embodiment, the pivot axis 50 in the door-closed position is at about 53% of the rigid door panel height. For a rigid door panel 12 of about 78 inches in height, with a 3 inch compressible weather strip 46 compressing down to about 2 inches in the door-closed position, this means the pivot axis 50 in the door-closed position is about 43½ inches above the floor/bottom of the upright 16.

To provide such a pivot axis 50, as well as to assist in assembling the garage door assembly 10, the skeleton 30 preferable preferably includes two pivot arm openings, one defined through each side stud 34 and inside each cross brace 40. The exposed end of the pivot arm opening is open to receive a pivot arm 52 which defines the pivot axis 50 for the door panel 12. For instance, the pivot arm opening can be a 2×2 inch longitudinally-extending inner recess exposed on each of the side edges 24 of the door panel 12. The preferred pivot arms 52 include a block section 54 which after assembly resides inside the pivot arm opening and a cylindrical section or pivot pin 56 which after assembly extends outside the pivot arm opening, past the side edge 24 of the door panel 12. Alternatively, particularly depending upon the power source for the door assembly 10 and the importance of a totally clean door opening, the cylindrical sections could be located laterally inwardly from the side edges 24 of the door panel 12. In the preferred embodiment, the pivot axis 50 for the door panel 12 coincides with the longitudinal axis of the cross braces 40, centered front to back within the door skeleton 30.

Each pivot pin 56 is in turn received within a hollow cylindrical bushing 58. As known in the bearing art, each bushing 58 is formed of a smooth, lubricious material relative to the pivot arm 52, so as to provide bearing support while minimizing rotational friction. Alternatively, ball bearings or other similar known bearing structures could be used to reduce friction for the pivoting motion of the door panel 12.

Figure 17:
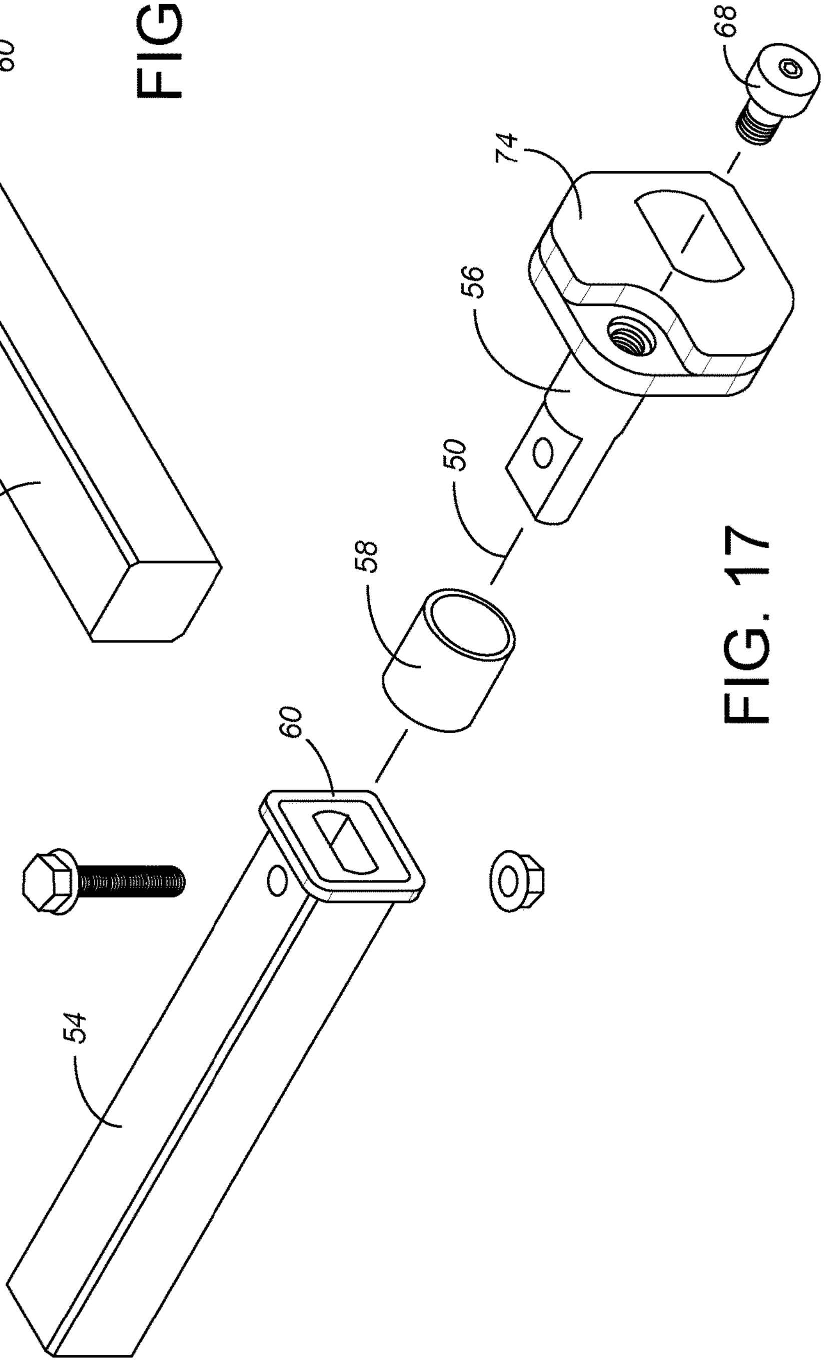
FIG. 17 is an exploded perspective view of the pivot bar and cam follower of FIG. 16.

The pivot pin 56 of the pivot arm 52 must be strong enough to carry the substantial entirety of the weight of the door panel 12 without shearing, and in preferred embodiments is within the range of about 1 to 2 inches in diameter, and most preferably 1½ inches in diameter. The block section 54 of the pivot arm 52 must extend for a sufficient length and mate with the interior of the pivot arm opening (i.e., interior of cross brace 40) sufficiently tightly to hold the pivot arm 52 horizontal, coincident with the pivot axis 50, despite the moment put on the pivot arm 52 by the weight of the door panel 12. In the preferred embodiment, the block section 54 extends for at least 2 inches, and more preferably for about 12 inches or more past the side edge 24 of the door panel 12. A stop 60 may be welded or otherwise rigidly attached to the pivot arm 52 and positioned so the pivot arm 52 cannot be further inserted into the pivot arm opening than desired. If desired, each block section 54 might be rigidly joined to the skeleton frame 30. Alternatively and more preferably, the block section 54 may be permitted to slide to a limited degree within its cross brace 40, thereby allowing some side to side play of the door panel 12 relative to the uprights 16. As best shown in FIG. 17, the pivot pin 56 and block section 54 may be separately formed and joined together such as by bolting, adhesive, welding etc. during door assembly, or alternatively the pivot arm 52 may be formed with both the pivot pin 56 and the block section 54 as a single integral metal piece.

As noted earlier, the pivot axis 50 for the door, jointly defined by the bushing 58 and the pivot pin 56, rises while the door panel 12 is being opened and lowers while the door panel 12 is being closed. In the preferred embodiment, this motion is entirely linear and vertical, with the motion of the bushing 58 constrained to follow a linear, vertical path. The use of a linear path for the bushings/pivot pins 58/56 allows hydraulic cylinders to be used as constraining members which control the path of each pivot pin 56 between its lower door-closed position and its upper door-opened position. The door assembly 10 could alternatively use a rotating screw drive (not shown) through a bushing bracket (not shown), with the screw similarly linearly constraining the path of each cylindrical pivot pin 56 between its lower door-closed position and its upper door-opened position. If a chain drive is used, the path of the pivot pin 56 needs to be constrained with different structure, such as a tracking system for the bushings 58 to ride in, in which case the bushing track (not shown) need not be entirely linear.

Figure 11:
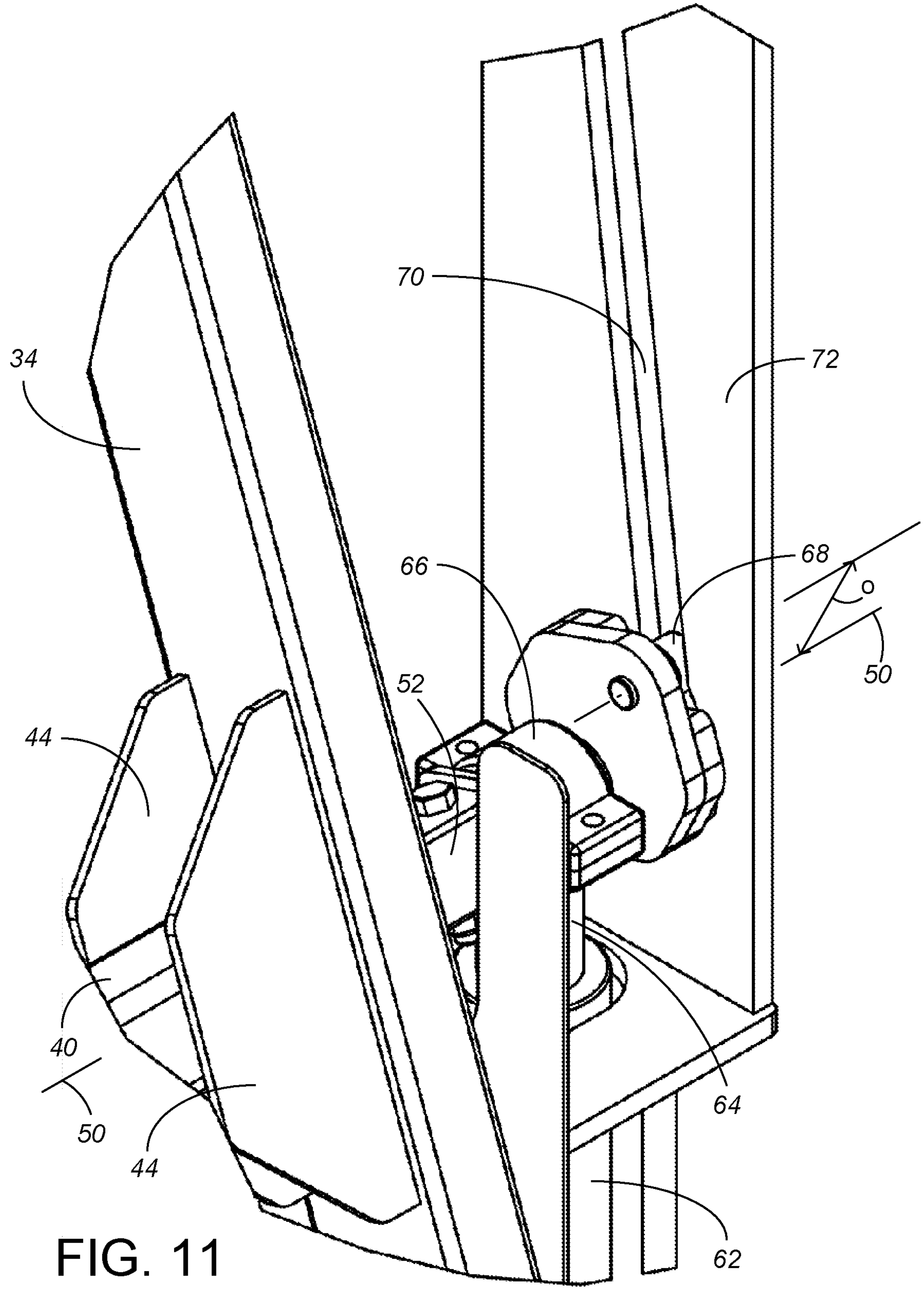
FIG. 11 is an enlarged view of the portion of FIG. 10 within the circle line 11.

The door assembly 10 is most preferably powered by two vertically oriented hydraulic cylinders 62, each positioned in one of the uprights 16 for the door opening, with the hydraulic cylinder rams 64 supporting the bushings 58 for the door panel 12. In the preferred embodiment, the cylinders 62 are beneath the bushings 58, vertically moving the door pivot axis 50. The bushings 58 are held in place on the ends of the rams 64 with a bolt attached bushing bracket 66, best shown in FIG. 11. Each hydraulic cylinder 62 is controllable via a hydraulic circuit (not shown) to extend from a shortened position to a lengthened position or to retract from the lengthened position to the shortened position. When the rams 64 of the hydraulic cylinder 62 push the bushings 58 upward, the door panel 12 rotates from a closed, vertical orientation to an opened, largely (or more preferably entirely) horizontal position. For instance, the preferred hydraulic cylinders 62 have a shortened length of about 42 inches, and a total stroke of the cylinders 62 from the door-closed position to the door-opened position is 33⅝ inches. With a 4 inch thick door panel 12, this provides a clearance under the door panel 12 in the door-opened position of about 75⅝ inches. In the most preferred door-opened position, the door panel 12 extends at a 90° angle or horizontal position, such that the door panel 12 (including weather strip 46) extends about 40.5 inches outside the uprights 16 and 32.5 inches inside the uprights 16. The door panel 12 extending outside the uprights 16 in the opened position is useful as a canopy providing shade and protection from falling precipitation.

The pivoting rotation of the door panel 12 is preferably controlled by a follower 68 secured to the door panel 12 at an offset o relative to the pivot axis 50, with the follower riding a track 70. The track 70 places forces on the follower 68 during vertical motion of the pivot axis 50 between the door-closed position and the door-opened position. The offset o causes the forces to act as moments rotationally accelerating and rotationally decelerating the door panel 12 between the door-closed position and the door-opened position. In the most preferred embodiment, the track is provided as a slot 70 in a vertically oriented plate 72, and the follower is a cam follower 68, also referred to as a stud-type needle roller bearing. The cam follower 68 has its distal end riding in the slot 70 and its proximal end threaded into an orientation plate 74. The preferred uprights 16 have the plate 72 positioned within the upright 16 just wider than the path of the ram 64. An alternative embodiment uses a slot follower that doesn't roll but only slides within the slot 70. The most preferred slot 70 has generally parallel edges defining a slot 70 which is consistently 1.2 inch wide, with the rolling end diameter of the cam follower 68 sized to mate into the slot 70 with only slight clearance. In some alternative embodiments, the slot width changes during its length, so the rotational speed of door panel pivoting as a function of pivot axis elevation on the way up is not an exact reversal of the rotational speed of door panel pivoting on the way down.

Once assembled, the orientation plate 74 is fixed relative to the cylindrical pivot pin 56, such as by having a keyed connection and/or by welding. In the most preferred embodiment, the orientation plate 74 locates the center line (axis) of the cam follower 68 at an offset o (moment arm) of about 2.8 inches from the pivot axis 50. Meanwhile, the slot 70 has a total horizontal movement from bottom to top of 4 inches, with the bottom of the slot 70 being 2 inches outside/in front of the pivot axis 50 and the top of the slot being 2 inches inside/behind the pivot axis 50. During the total throw of the door the cam follower 68 riding within the slot 70 will cause the orientation plate 74 to pivot 90°. Alternative embodiments pivot less than 90° or more than 90° if it is desired that the bottom edge 18 of the door panel 12 be either higher or lower than the top edge 18 of the door panel 12 when in the door-opened position, such as in a range of 75-105°. The preferred embodiment is assembled with the center line (axis) of the cam follower 68 being at a higher elevation than the pivot axis 50, so the slot 70 causes the cam follower 68 to rotate from 45° before top dead center to 45° after top dead center. Alternative embodiments can locate the center line (axis) of the cam follower 68 at a lower elevation than the pivot axis 50, simultaneously lowering the height of the plate 72 relative to the pivot axis 50, to achieve an identical result. The preferred embodiment utilizes two mirror-image followers 68 and tracks 70, one in each upright 16, but an alternative embodiment could use a single follower 68 and track 70 in only one of the uprights 16.

The pivot pin 56 rotates within the oil-embedded bushing 58 and transfers the rotational movement of the orientation plate 74 to the block section 54, which causes rotation of the cross-braces 40/crossbar 42 and the door panel 12 as a whole about the pivot axis 50 of the pivot pin 56.

Figure 12:
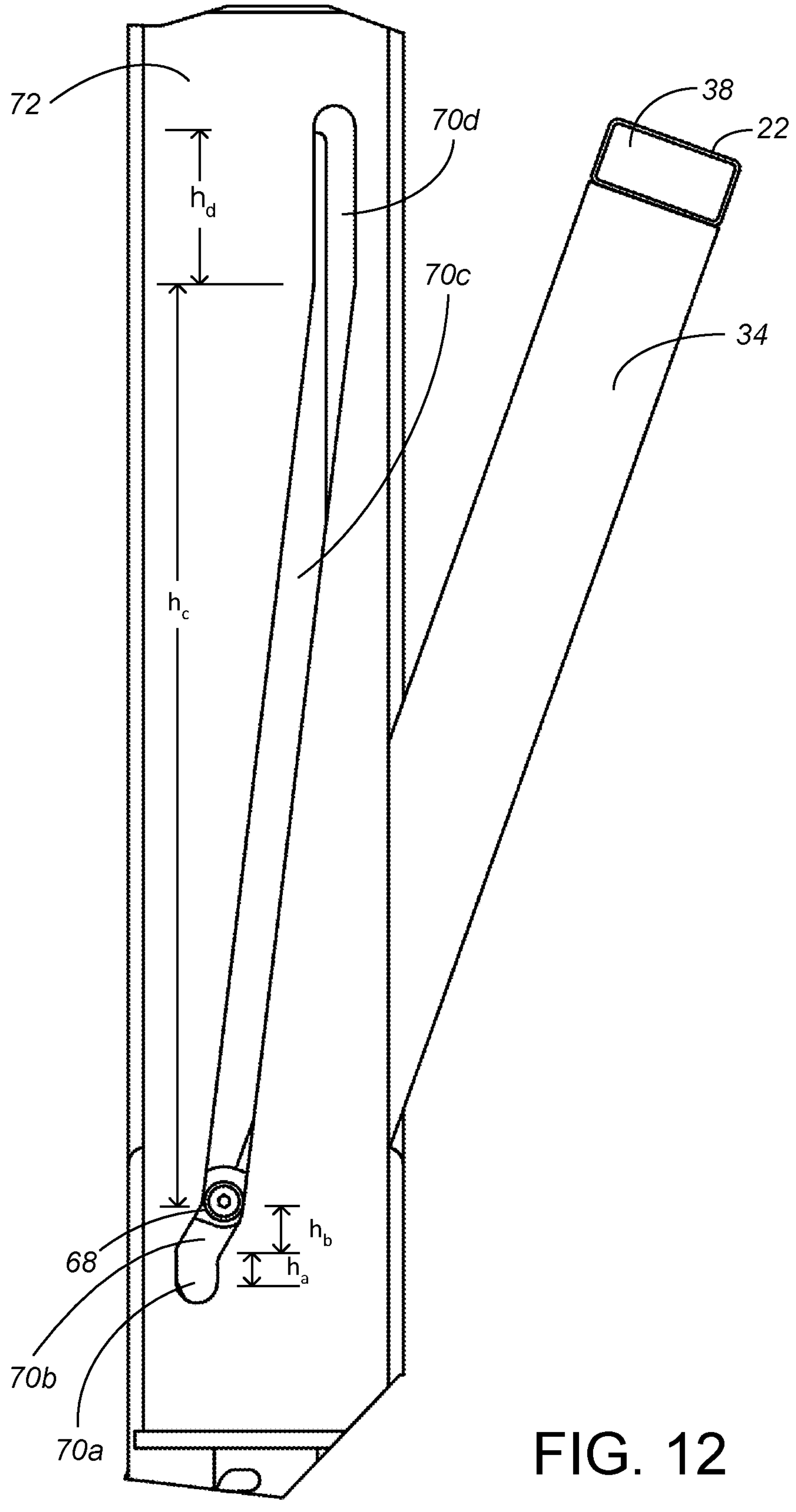
FIG. 12 is an outer side view of a portion of FIG. 10 and all of FIG. 11.
Figure 13:
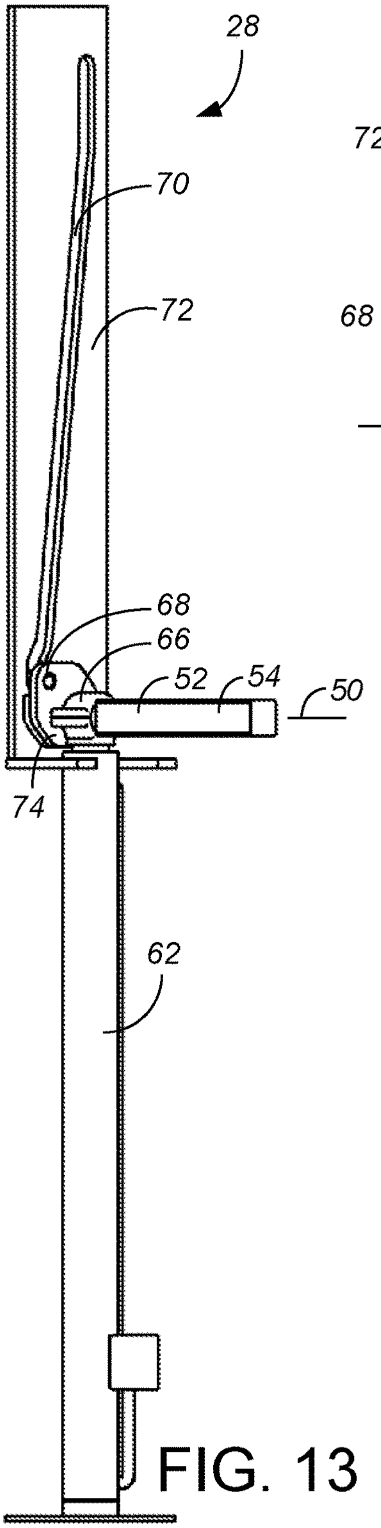
FIG. 13 is a perspective side view of one of the preferred power structures for the door assembly of FIGS. 1-9, inside the left (when facing the door from outside) upright, shown from in front of the door, shown in its door-closed position.
Figure 14:
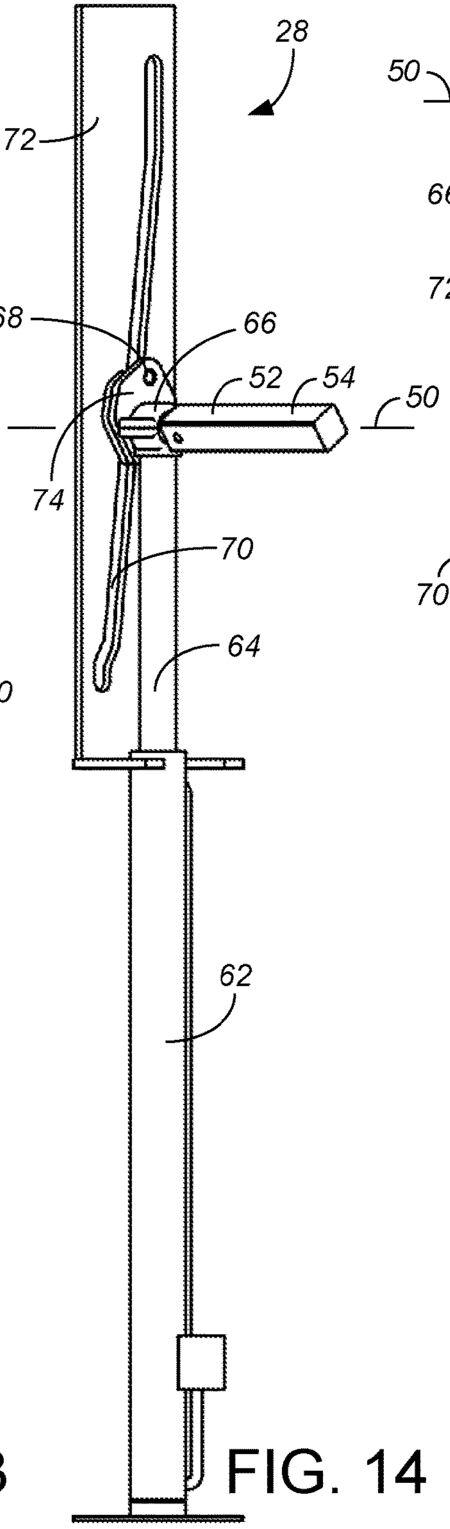
FIG. 14 is a perspective side view of the power structure of FIG. 13, shown in a partially opened position.
Figure 15:
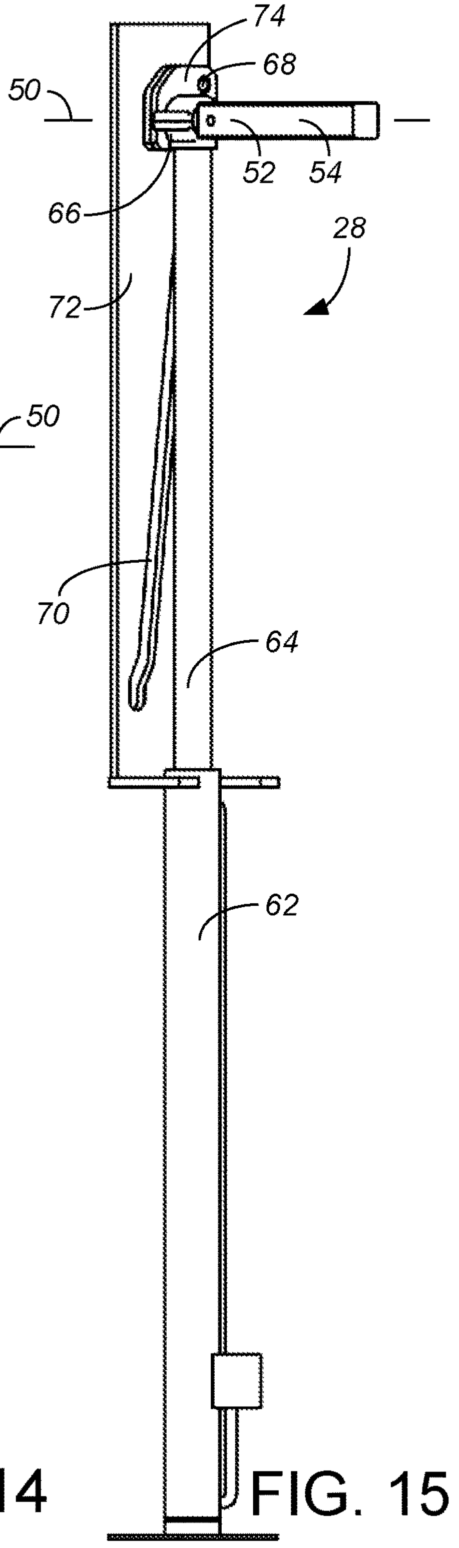
FIG. 15 is a perspective side view of the power structure of FIGS. 13 and 14, shown in a door-opened position.
Figure 16:
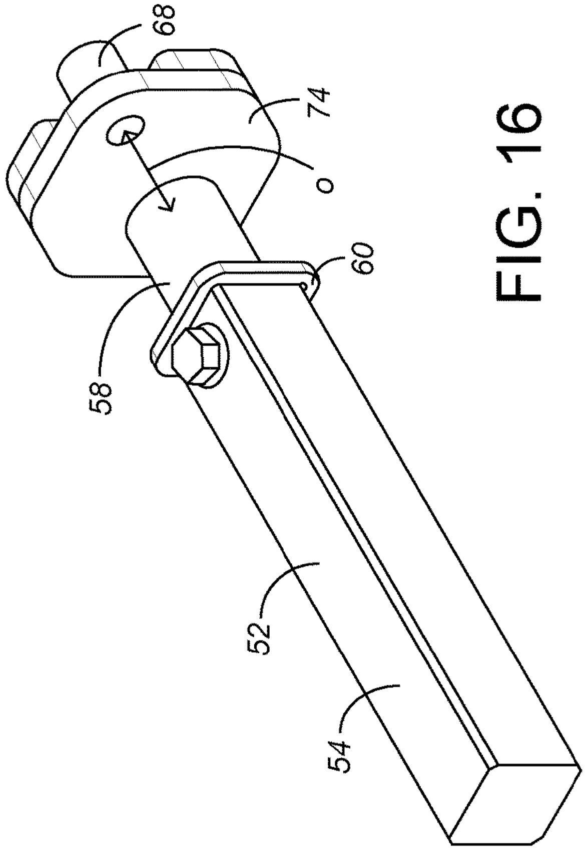
FIG. 16 is a perspective view of the pivot bar and cam follower within the power structure of FIGS. 13-15.

In contrast to the various linkage systems of the prior art, the fact that a track 70 and follower 68 are used to induce the pivoting rotation of the door panel 12 gives great flexibility to engineer the exactly desired rotational position of the door panel 12 as a function of ram extension. This flexibility to design the door rotational position is best seen with respect to FIG. 12, which details four separate sections of the preferred slot 70.

Moving upwardly, the preferred slot 70 starts with a vertical section 70*a*, which in the most preferred embodiment has a height of 1.595 inches. The center line (axis) of the cam follower 68 can travel a height ha of 0.84 inches while the cam follower 68 is within the vertical section 70*a*. During opening, the door panel movement starts raising with the door fully vertical. During closing, the door panel movement ends lowering with the door fully vertical. The reason for the initial vertical part of the motion is so, in the fully closed position, the door panel 12 is locked against movement out of its vertical position with less play. To have this vertical part of door motion, the preferred arrangement has a gap greater than the fully vertical movement height ha, above the door panel 12 and below the horizontal header 14, which in the preferred embodiment is covered with the compressible weather strip 48.

Continuing with motion of the door panel 12 upward, the slot 70 then has a fast rotation section 70*b*. In the most preferred embodiment, the fast rotation section 70*b* is about 1.494 in length, where the door rotates about 19° during only a 1.3 inch extension movement $h_b$ of the ram 64. The reason for the fast rotation section 70*b* is to "kick" the top of the door panel 12 clear of the header 14 (requiring at least about 9° of door panel rotation) and then to help keep the door panel 12 from contacting any ceiling (not shown, but assumed to be at minimum/worst case the height of the rough opening).

Continuing with motion of the door panel 12 upward, the slot 70 then has a slow rotation section 70*c* for most of its length. While the cam follower 68 is in the slow rotation section 70*c*, the door panel 12 of the most preferred embodiment rotates from the 19°-from-vertical orientation to a fully horizontal orientation during about a 26.7 inch extension movement $h_c$ of the ram 64. The reason for the slow rotation section 70*c* is for smooth rotation of the door panel 12 while keeping the door panel 12 from contacting the ceiling (not shown). Note that avoidance of any ceiling is unnecessary if the door assembly 10 is mounted oppositely so the bottom moves inwardly into the garage.

Finally as the door panel 12 moves upward, the slot 70 has a final horizontal raising section 70*d*, where the door raises its final height $h_d$ of 4.595 inches while fully horizontal and until it contacts the weather strip 48. The reason for the horizontal raising section 70*d* is to lock the door panel 12 against movement out of its horizontal position with less play.

During closing, the door panel 12 moves through these four distinct movement portions 70*d*, 70*c*, 70*b*, 70*a* in opposite order and direction. Workers skilled in the art will understand that the various sections of the cam slot 70 can have different dimensions or curves to achieve any selected rotational position of the door panel 12 as a function of ram extension, all carefully selectable by the door designer for a particular installation. However, the preferred embodiment has a slot 70 designed to meet the above objectives, as well as being easily machinable.

Although the present invention has been described with reference to preferred embodiments, workers skilled in the art will recognize that changes may be made in form and detail without departing from the spirit and scope of the invention. In particular, the dimensions and materials listed are exemplary only unless listed in a particular claim.

What is claimed is:

1. A door assembly for providing a door for access through a sidewall of a building, the door assembly comprising:

a door panel which is substantially rigid during operation of the door assembly moving the door panel between a door-closed position in which the door panel is substantially vertical and a door-opened position in which the door panel is angled relative to the door-closed position, the door panel having a top edge, a bottom edge, a first side edge and a second side edge;

a door support secured to the door panel at a door-closed elevation between the top edge and the bottom edge, the door support having two ends defining a pivot axis for the door panel, the door support and pivot axis moving at least vertically in a path between a lower door-closed position and an upper door-opened position, the ends of the door support supporting substantially all of the weight of the door panel when in the upper door-opened position;

a constraining member which controls the path of the door support between the lower door-closed position and the upper door-opened position;

a first upright running substantially vertically in a stationary position during opening and closing of the door panel, the first upright defining a track;

a second upright running substantially vertically in a stationary position during opening and closing of the door panel, the first upright and the second upright collectively defining a door opening therebetween which door opening is substantially covered by the door panel in the door-closed position; and a follower secured to the door panel at an offset relative to the pivot axis, the follower riding the track, wherein the track places forces on the follower during motion of the door panel between the door-closed position and the door-opened position, the offset causing the forces to act as moments rotationally accelerating and rotationally decelerating the door panel between the door-closed position and the door-opened position, wherein the track provides a corresponding section of vertical movement of the door panel during which the door panel does not rotate as the door support enters or leaves at least one of the lower door-closed position and the upper door-opened position.

2. The door assembly of claim 1, wherein the door support moves linearly in a substantially vertical direction between the lower door-closed position and the upper door-opened position while rotating about the pivot axis.

3. The door assembly of claim 2, wherein the door support comprises a rectangular door support crossbar and cylindrical ends.

4. The door assembly of claim 3 as a powered door assembly, wherein the constraining member is a hydraulic cylinder with a ram, the hydraulic cylinder extending substantially vertically adjacent or within the first upright, the ram moving the door support crossbar vertically.

5. The door assembly of claim 4, wherein the hydraulic cylinder is under the door support crossbar, and wherein the pivot axis of the door support crossbar is at an elevation within a range of 40% to 75% of a door panel height when in the door-closed position.

6. The door assembly of claim 5, wherein the pivot axis of the door support crossbar is at an elevation within a range of 51% to 60% of the door panel height when in the door-closed position.

7. The door assembly of claim 6 provided as a California-type door having a single door panel.

8. The door assembly of claim 2, wherein the track is a slot in a plate.

9. The door assembly of claim 8, wherein the slot includes a first vertical section, and the door assembly provides a providing the corresponding section of vertical movement of the door panel during which the door panel does not rotate.

10. The door assembly of claim 9, wherein the first vertical section is at a bottom of the slot, and wherein the door panel is in a vertical orientation while the follower is within the first vertical section.

11. The door assembly of claim 10, wherein the first vertical section is less than 4 inches in height.

12. The door assembly of claim 9, wherein the first vertical section is at a top of the slot, and wherein the door panel is in a horizontal orientation while the follower is within the first vertical section.

13. The door assembly of claim 12, wherein the slot includes a second vertical section.

14. The door assembly of claim 8, wherein the slot includes a fast rotation section and a slow rotation section.

15. The door assembly of claim 14, wherein the fast rotation section is below the slow rotation section.

16. A door assembly providing a one piece, swing up door for providing access through a sidewall of a building, the door assembly comprising:

a door panel which is substantially rigid during operation of the door assembly moving the door panel between a door-closed position in which the door panel is substantially vertical and a door-opened position in which the door panel is angled relative to the door-closed position, the door panel having a top edge, a bottom edge, a first side edge and a second side edge;

a door support secured to the door panel at a door-closed elevation between the top edge and the bottom edge, the door support defining a pivot axis for the door panel, the door support and pivot axis moving at least vertically in a path between a lower door-closed position and an upper door-opened position; and a control structure which controls the path of the door panel as the door support moves from the lower door-closed position to the upper door-opened position which includes a rotational motion portion during which the pivot axis translates vertically while the door panel pivots and subsequently a non-rotational motion portion during which the pivot axis translates vertically without pivoting of the door panel as the door support enters the upper door-opened position.

17. The door assembly of claim 16, in which the path of the door panel support from the lower door-closed position to the upper door-opened position further includes, prior to the rotational motion portion, an initial non-rotational motion portion during which the pivot axis translates vertically without pivoting of the door panel as the door support leaves the lower door-closed position.

18. The door assembly of claim 16, in which the control structure comprises a cam follower riding in a slot of a plate, the cam follower being secured to the door panel at an offset relative to the pivot axis, wherein the slot places forces on the cam follower during motion of the door panel between the door-closed position and the door-opened position, the offset causing the forces to act as moments rotationally accelerating and rotationally decelerating the door panel between the door-closed position and the door-opened position.

19. A door assembly providing a one piece, swing up door for providing access through a sidewall of a building, the door assembly comprising:

a single door panel which is substantially rigid during operation of the door assembly moving the door panel between a door-closed position in which the door panel is substantially vertical and a door-opened position in which the door panel is angled relative to the door-closed position, the door panel having a top edge, a bottom edge, a first side edge and a second side edge;

a first upright adjacent the first side edge while the door panel is in the door-closed position, the first upright remaining stationary during opening and closing of the door panel;

a second upright adjacent the second side edge while the door panel is in the door-closed position, the second upright remaining stationary during opening and closing of the door panel;

a header extending from a top of the first upright to a top of the second upright, the first upright, the second upright and the header collectively defining a door opening which door opening is substantially covered by the door panel in the door-closed position but with a vertical gap between the top edge of the single door panel and a bottom of the header;

a door support secured to the door panel at a door-closed elevation between the top edge and the bottom edge, the door support defining a pivot axis for the door panel, the door support and pivot axis moving at least vertically in a path between a lower door-closed position and an upper door-opened position; and a control structure which controls the path of the door panel as the door support moves from the lower door-closed position to the upper door-opened position which includes a non-rotational motion portion during which the pivot axis translates vertically without pivoting of the door panel taking up at least part of the vertical gap and subsequently a rotational motion portion during which the pivot axis translates vertically.

20. The door assembly of claim 19 as a powered door assembly, further comprising a hydraulic cylinder with a ram, the hydraulic cylinder extending substantially vertically adjacent the first upright, the ram moving the door support vertically.

* * * * *